United States Patent [19]

Reuben

[11] 4,382,986

[45] May 10, 1983

[54] AUTOMOBILE FLOOR MAT WITH TWO BASE PORTIONS OF DIFFERENT ELASTOMERIC MATERIALS

[75] Inventor: Harold Reuben, Akron, Ohio

[73] Assignee: The Akro Corporation, Canton, Ohio

[21] Appl. No.: 347,343

[22] Filed: Feb. 9, 1982

[51] Int. Cl.³ .................... B32B 5/18; D04H 11/00
[52] U.S. Cl. ................................ 428/88; 428/95; 428/124; 428/156; 428/172; 428/174; 428/192; 428/193; 428/213; 428/217
[58] Field of Search ................. 428/88, 95, 124, 156, 428/172, 174, 192, 193, 213, 217

[56] References Cited

U.S. PATENT DOCUMENTS 4,230,755  10/1980  Morris .................................. 428/95

*Primary Examiner*—Marion McCamish
*Attorney, Agent, or Firm*—Yount & Tarolli

[57] ABSTRACT

An automobile floor mat designed to reduce movement of the mat relative to the floor having a relatively stiff portion and a second portion having a relatively flexible portion, the stiff and second portions each having base portions of monolithic elastomeric materials connected in a hinge area so that the mat can be molded in a single molding operation. The relative difference in rigidity permits the flexible portion to bend relative to the stiff portion and can be accomplished by materials of different thickness or rigidity or both.

21 Claims, 6 Drawing Figures

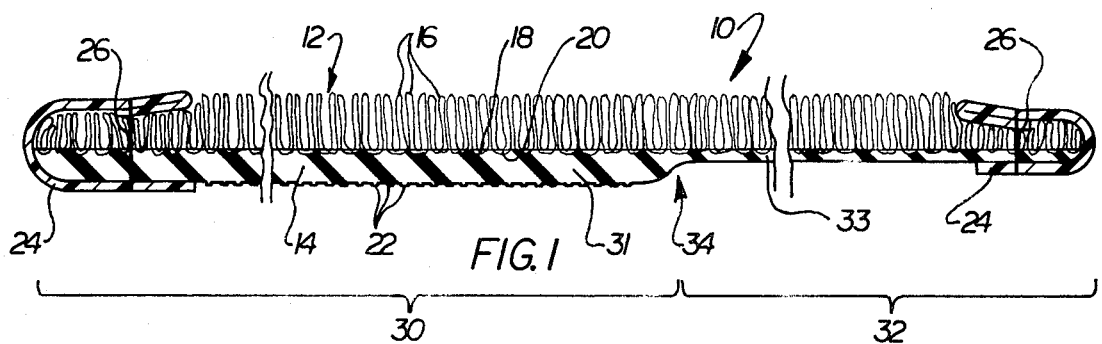
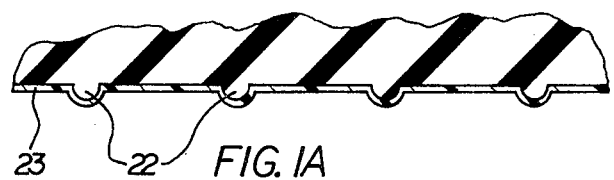
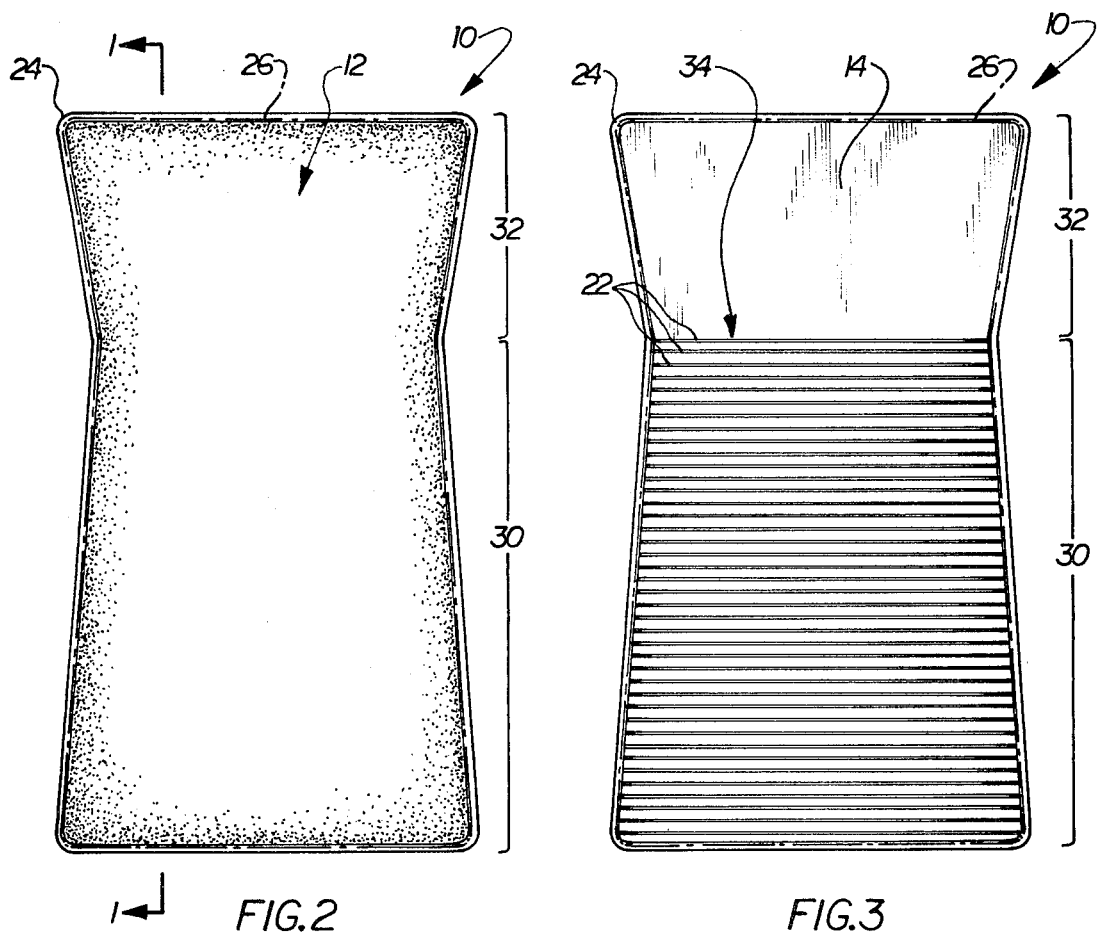

AUTOMOBILE FLOOR MAT WITH TWO BASE PORTIONS OF DIFFERENT ELASTOMERIC MATERIALS

BACKGROUND OF THE INVENTION

1. Field of the Invention

The present invention relates to mats for use in automobiles, and particularly to automobile mats which have portions which cover a part of the automobile floor and another part which covers the automobile firewall.

2. Description of Prior Art

Automobile floor mats of the type which are normally and popularly used to protect the floor in an automobile and which can be removed for cleaning are generally made of an elastomeric material and optionally can have a carpet layer secured to the elastomeric material. Generally, such an elastomeric automobile floor mat is made sufficiently flexible to conform to the multiplicity of shapes and contours of automobile floors.

There is a tendency for automobile floor mats to move or shift from their intended position on the automobile floor due to the action of the driver's and passenger's feet on the mats and particularly due to the action of people getting into and out of the automobile. This tendency to move or shift results in the bunching or gathering of the mat and the general disarray of the mat on the floor. This action of the mat on the driver's side represents a potential danger if the mat has moved so as to interfere with the accelerator, brake pedal or clutch of the automobile.

In an effort to minimize this problem, many mats have been designed to increase the coefficient of friction between the mat and the surface supporting the mat. One technique to accomplish this is with a variety of nibs or corrugations molded into the back of the elastomeric layer. Some mats on the market have an additional anti-skid layer, such as a polyurethane coating, on the bottom of the elastomeric material to provide a better coefficient of friction between the mat and the floor's surface.

One prior art effort involves a uniform-thickness, elastomeric material reinforced or stiffened in the portion normally against the horizontal automobile floor. The portion normally against the firewall or inclined floor was more flexible because of the lack of any reinforcement. The portion against the horizontal floor was reinforced or stiffened by a wire reinforcing material embedded in and cured with the elastomeric backing material. One disadvantage with this product is that flexure of the automobile mat can result in a permanent crease due to the presence of the wire. Also, this product is cumbersome to produce because the wire material must be embedded in the elastomeric material, which requires an extra handling operation to place the wire in a mold. This adds to the cost of manufacture because of the wire itself and the labor involved in precisely locating the wire in the mat.

Other prior art efforts have been made to prevent slippage by use of positive retention of the mats on the floor, e.g., hooks, snap fasteners, Velcro fasteners, zipper fasteners, etc., but none of these methods has been successful commercially.

Stroud U.S. Pat. No. 1,661,018 discloses a carpet having reinforced edges to resist upturned corners. Stumpf U.S. Pat. No. 3,709,768 describes a method of making a high-loft, non-woven fabric and states that a backing material may be added to the fabric to increase its strength. See column 2, line 65 to column 3, line 4; column 4, lines 62–73; and column 20, lines 25–40. Hartmann U.S. Pat. No. 4,169,176 discloses a shaped automobile carpet in which a spun, non-woven fabric is bonded to a back lining of a spun non-woven fabric by use of a sintered polyethylene layer. See FIG. 2 and column 1, line 60 to column 2, line 2. German Offenlegungsschrift No. 25 57 719 discloses an automobile laminated carpet with a recess 4 (see FIG. 1) designed to fit into a specified automobile floor cavity.

Copies of the foregoing published patents were appended to the original application papers.

SUMMARY OF THE INVENTION

An automobile floor mat is provided having an improved ability to stay in place on an automobile floor and which can be manufactured in a single molding step from an elastomeric layer, and a carpet layer if desired. The automobile floor mat of the present invention has a relatively stiff first section and a second section having a relatively flexible portion of elastomeric material. The second section has the ability to easily bend in a hinge area relative to the stiff section. The relatively stiff section is created without the need for any additional structural member or part, such as reinforcing.

The first or relatively stiff portion is adapted to contact a generally horizontal portion of an automobile floor. The second portion, is adapted to contact an inclined portion or firewall of an automobile floor adjacent to the generally horizontal floor portion. The first or relatively stiff portion has a first base portion of a first monolithic elastomeric material with a Shore A durometer greater than about 70. The second portion has a second base portion of a second monolithic elastomeric material. The first or relatively stiff portion and the second portion are connected at a hinge area in a manner that enables the floor mat to be molded in a single molding operation from an elastomeric layer, and a carpet layer if desired. The second monolithic elastomeric material is less stiff or less rigid than the first elastomeric material so that the second portion may be readily bent relative to the first portion at the hinge area in the flexible portion.

Preferably, each of the first and second base portions in the first or stiff portion and the second portion, respectively, has a uniform thickness throughout.

The differences in rigidity of the elastomeric materials in the present invention can be accomplished by using materials having a different bending modulus or apparent modulus of rigidity. Alternatively, the identical material can be used but in different thicknesses to achieve the relative difference in flexibility. Further, a combination of materials having different stiffnesses and thicknesses can be employed.

The elastomeric material for the relatively rigid section has a Shore A durometer greater than about 70 and preferably greater than about 80, and most preferably about, 85. If the identical elastomeric material is to be utilized in both sections, the relative difference in rigidity or stiffness can be achieved by having a flexible portion constructed to a thickness in the range of about 25% to about 50% of the thicker, rigid portion, preferably about 35%. The difference in relative flexibility can also be achieved by using a flexible section about the same thickness as the relatively rigid section with the difference that the flexible section uses an elastomeric material more than about 20 points Shore A durometer below the rigid section. In that event, the flexible section preferably utilizes an elastomeric material of a Shore A durometer in the range of about 30 to 50, more preferably about 40.

The term "monolithic" is used herein as applied to the elastomeric material to mean that the material is of relatively uniform composition without structural reinforcing materials.

BRIEF DESCRIPTION OF DRAWINGS

In the drawings, wherein like numerals are employed to designate like parts throughout:

FIG. 1 is a partial cross section of an elastomerically backed carpet illustrating the present invention, the section line being taken along line 1—1 of FIG. 2;

FIG. 1A is an enlarged view of the lower portion of the section in FIG. 1;

FIG. 2 is a top plan view of the elastomerically backed carpet shown in cross section in FIG. 1;

FIG. 3 is a bottom plan view of the elastomerically backed carpet shown in cross section in FIG. 1;

DESCRIPTION OF PREFERRED EMBODIMENTS

Figure 4:
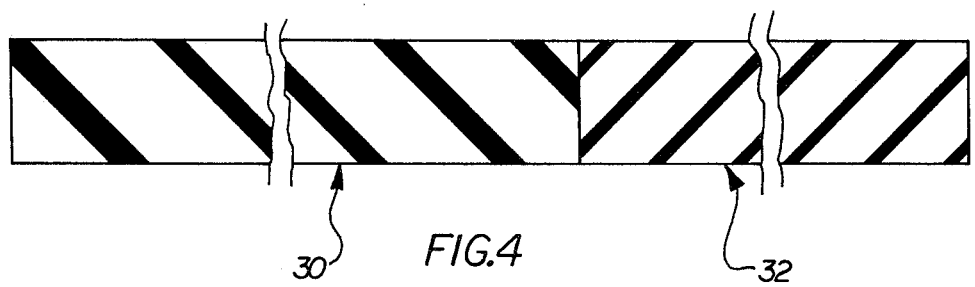
FIG. 4 is a cross section of an alternative embodiment of the elastomeric layer.

A cross section of an elastomerically backed tufted carpet 10 is shown in FIG. 1 having a carpet layer 12 laminated to an elastomeric backing 14. The carpet layer 12 has a plurality of fibers 16 which form the pile of the carpet adjacent the top surface of the carpet layer. The plurality of fibers 16 extend through carpet backing 18 and are interconnected to adjacent fibers through loops 20. Fiber loops 20 are embedded in the elastomeric backing 14 to mechanically lock the carpet layer 12 to the elastomeric backing 14.

The elastomeric backing 14 is provided with a textured anti-skid surface formed by a plurality of parallel ridges 22, more clearly shown in FIG. 1A. Ridges 22 are advantageously employed for automobile mat so that movement between the automobile mat and the automobile floor, frequently carpet, is reduced. To further reduce movement the lower surface of backing 14 can be coated with an anti-skid coating 23, such as a polyurethane.

The first or rigid portion 30 has a first base portion 31 of a first monolithic elastomeric material. The second portion 32 has a second base portion 33 of a second monolithic elastomeric material providing a flexible section relative to the rigid portion.

For many applications, it is desirable to trim the elastomerically backed carpet 10 with a binding 24 which is secured to the periphery of carpet 10 by stitches 26.

The elastomeric material is preferably preshaped into discrete sections, such as sheets or slabs, of the elastomer. This permits molding of separate carpet sections with separate elastomeric backing sections. The elastomeric backing material 14 can be formed from any suitable elastomeric material. The term "elastomeric" is intended to include rubbers and rubber-like materials, e.g., flexible polyvinyl chloride, which is a thermoplastic material. Vulcanizable elastomers which are cured by a sulfur reaction mechanism or a metallic oxide mechanism are suitable for use in the present invention as the elastomer backing section. Rubbers are particularly suitable for use as the elastomeric backing material, such as natural rubber, butadiene polymers and copolymers such as styrene-butadiene rubbers and polybutadiene rubbers, isoprene polymers and copolymers, chloroprene rubbers such as neoprene, nitrile rubbers, butyl rubbers, and ethylene-propylene rubbers. Styrene-butadiene rubbers are particularly preferred for use in the present invention.

The heat deformable pile carpet preferably employed in the present invention may be tufted, woven or needlepunched and may be backed or unbacked. The fibers of the carpet pile can be composed of natural or synthetic fibers and may be thermoplastic or thermosetting. The carpet fibers preferably used in the carpet piles employed in the present invention are polyamide fibers such as nylon fibers, particularly nylon 6 and nylon 66, polyester fibers, acrylic fibers and polypropylene fibers. The carpet pile can be a cut pile or a looped pile. A cut pile, nylon-tufted carpet with a jute backing is preferred for use in the present invention and is depicted in FIG. 1.

The present invention is useful without the carpet layer shown in the preferred embodiment in FIGS. 1-3. For example, the embodiment shown in FIG. 1 could be made without the carpet layer and the binding leaving only the elastomeric material in the form shown. Similarly, FIGS. 4 and 5 show alternative embodiments of the elastomeric layer 14 without a carpet layer, but they could be laminated with a carpet layer 12 if desired.

The automobile mat shown in FIG. 1 has a first or generally stiff portion 30 and a second portion 32 having a flexible portion. The flexible portion preferably has a thickness about one half or less the thickness of the relatively stiff portion 30. The difference in thickness allows the second portion to bend relative to the generally stiff portion 30 in an hinge area 34 adjacent the junction between the stiff portion 30 and the second portion 32.

An alternative embodiment is shown in FIG. 4, wherein the relatively stiff section 30 and the second section 32 utilize different elastomeric materials. The stiff section 30 and the second section 32 are bonded together in a single molding operation. In the embodiment in FIG. 4, the relatively stiff section 30, although the same thickness as the second section 32, is composed of a elastomeric material having a greater stiffness compared to the flexible section 32, i.e., a greater apparent modulus of rigidity.

Figure 5:
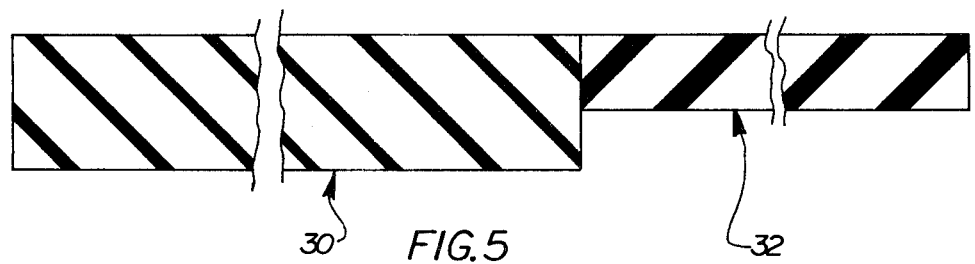
FIG. 5 is another alternative embodiment of the elastomeric layer.

FIG. 5 illustrates another alternative embodiment wherein the relative difference in rigidity between the stiff section 30 and the relatively flexible section 32 is accomplished by a combined use of different thicknesses and different materials. In this embodiment the stiff section 30 uses a more rigid material than the second section 32, and the latter is thinner than, but more than one half, the thickness of section 30.

In FIG. 1, the second portion 32 has a thickness less than about one half of the thickness of the relatively stiff section 30. Preferably, the thickness of the second portion 32 is in the range of about 25% to about 50% of the thickness of the stiff section 30, most preferably about 35%. In FIG. 4, the difference in stiffness or rigidity is accomplished by using different materials for each of the sections. In the relatively stiff section 30 an elastomeric material having a Shore A durometer greater than about 70, and most preferably about 85, is employed. The relatively flexible section 32 utilizes an elastomeric material having a Shore A durometer in the range of about 30 to 50, preferably about 40. To achieve the relative difference in flexibility, the more flexible material 32 should have a Shore A durometer about 20 points or more below than that of the stiffer section.

The alternative embodiment shown in FIG. 5 utilizes the concepts of both embodiments shown in FIGS. 1 and 4 by using materials of different stiffnesses as well as differences in thicknesses. However, the difference in thickness need not be as great as in FIG. 1 since different materials are used.

Figure 6:
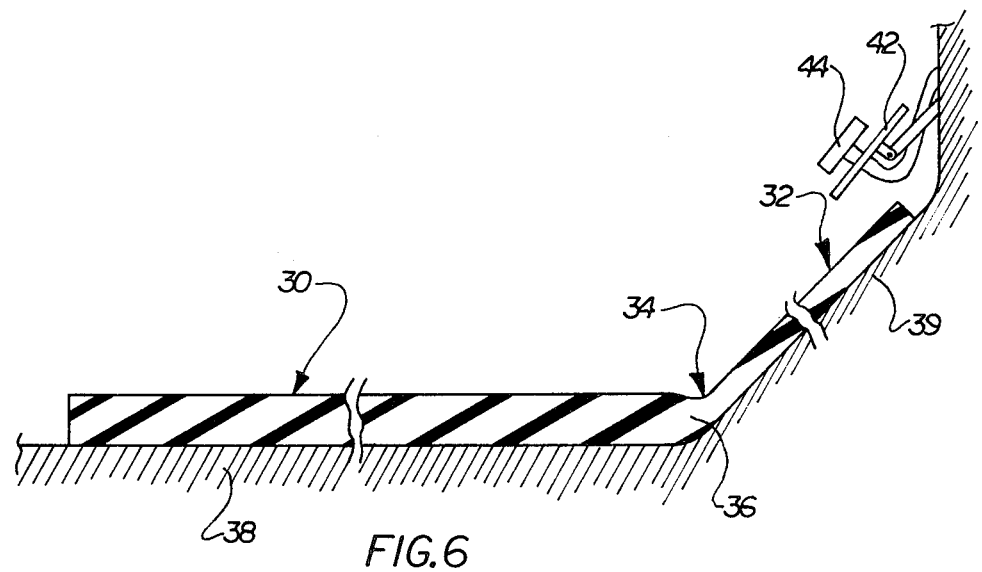
FIG. 6 is a cross section of an automobile floor mat made in accordance with the present invention shown schematically in place on an automobile floor.

FIG. 6 illustrates the use of an automobile floor mat according to the present invention. The relatively stiff section 30 is adapted to contact a generally horizontal portion of an automobile floor 38. A second portion 32 is adapted to contact an inclined portion or firewall 39 adjacent to said generally horizontal portion 38. An accelerator pedal 42 and a brake pedal 44 are schematically shown relative to the floor mat, particularly the second portion 32. Because of the difference in stiffness between the stiff section 30 and the second portion 32, the flexible portion of the automobile mat can bend in the hinge area 34, which because of the flexible nature of the flexible portion is actually part of the second portion 32. As a result of this hinging action, an edge 36 at the junction between the stiff section 30 and the second portion 32 acts as a stop to prevent movement of the stiff section 30 relative to the inclined floor section 39, i.e., the structure of the present invention has a tendency to reduce movement of the floor mat 10 relative to the automobile floor.

The distribution of the weight of the automobile mat 10 is such that the heaviest portion of the mat is the relatively stiff section 30 and rests on the generally horizontal floor portion 38. This heavy portion helps reduce the tendency of the floor mat 10 to slide up the inclined floor portion 39. Together, the heavier mass portion and the leading edge 36 reduce the tendency of the mat to move up the inclined floor wall 39 or in any direction relative to the automobile floor.

An important property of the elastomeric materials in the present invention is the apparent modulus of rigidity or the bending modulus. The bending modulus or the apparent modulus of rigidity of the relatively stiff section 30 should be sufficiently high to cause a resistance to changing planes when the mat tends to slide or move. The bending modulus or apparent modulus of rigidity of the second portion 32 should be low enough so as not to hinder the intended action of a relatively stiff section 30. Measuring the bending modulus or the apparent modulus of rigidity can be difficult on elastomeric materials. As a result, the Shore A durometer hardness measurement has been utilized herein since it is a more reasonably accurate measure, which translates itself into various degrees of stiffness of elastomeric materials, depending on the thickness.

Although scientific measurement of relative stiffness is difficult in elastomeric materials, the visual perception of the relative rigidity and flexibility in the present invention is apparent. This difference can be readily seen by taking a floor mat of the present invention and mounting the relatively stiff section on a table with the hinge area at the edge of the table. This allows the relatively flexible section to extend out over the end of the table. The relatively flexible section, for example, one made in accordance with Example I, herein, will droop or fall approximately 60° from the horizontal, demonstrating its flexibility. In contrast, extending a significant portion of the rigid section over the edge of the table, e.g., approximately four inches of a 15 inch long section, results in a droop or fall from the horizontal of no more than about 20°.

The automobile mat of the present invention may be formed by any well-known molding process which can mold an elastomeric material in the forms of the embodiments shown herein with or without the lamination of a carpet layer thereto. One preferred method is the lamination method disclosed in Reuben U.S. Pat. No. 4,174,991, which patent is herein incoporated by reference.

EXAMPLES

As used in the following examples, the styrene-butadiene rubbers have the following compositions:

| Components | Supplier | Typical Shore A Durometer 85 Parts by Weight | Typical Shore A Durometer 40 Parts by Weight |
|---|---|---|---|
| Styrene-butadine Rubber | Texas, U.S. - Port Neches Tex. | 90 | 100 |
| High Styrene Resin | Goodyear Chemicals Akron, Ohio | 10 | — |
| Filler (Clay) | Huber-Langley, So. Carolina | 300 | 100 |
| Plasticizer | Sun Oil - Philadelphia, Pa. | 10 | 30 |
| Zinc Oxide | St. Joe Zinc - Josephtown, Pa. | 5 | 5 |
| Benzothiazolyl disulfide | R. T. Vanderbilt - Akron, Ohio | 2 | 3 |
| Tetramethylthiuram disulfide | R. T. Vanderbilt - Akron, Ohio | 1 | 1 |

EXAMPLE I

An automobile floor mat was produced having the form of the invention depicted in FIGS. 1-3. The floor mat was formed by the patented process of U.S. Pat. No. 4,174,991. The relatively flexible and stiff sections were formed from the same 85 durometer rubber, but in order to achieve the desired flexibility and rigidity of the present invention, the relatively thick section 30 was made approximately 0.085 inches in thickness (0.26 cm) whereas the second portion was only 0.030 inches thick (0.076 cm). A single elastomeric layer was used having the appropriate thicknesses to produce the designated thicknesses above. The relatively stiff section 30 shown in FIG. 1 also had the anti-skid ridges 22 and the anti-skid polyurethane coating 23.

EXAMPLE II

In a similar manner, the embodiment of FIG. 4 can be formed from an elastomeric material having a uniform thickness of 0.080 inches (0.20 cm) with the relatively stiff section 30 made of an 85 durometer rubber and the second portion 32 made of 40 durometer rubber.

EXAMPLE III

In a similar manner, the alternative embodiment of FIG. 5 is made with the relatively thick section 30 composed of an 85 durometer rubber of 0.090 inches in thickness (0.23 cm) and the second portion 32 is formed from a 40 durometer rubber being 0.050 inches in thickness (0.127 cm).

What is claimed is:

1. An automobile floor mat comprising:
   a first portion adapted to contact a generally horizontal portion of an automobile floor,
   said first portion having a first base portion of a first monolithic elastomeric material with a Shore A durometer greater than about 70,
   a second portion adapted to contact an inclined portion adjacent said generally horizontal portion of an automobile floor,
   said second portion having a second base portion of a second monolithic elastomeric material,
   said first base portion and said second base portion being connected at a hinge area such that the mat can be molded in a single molding operation, and
   said second monolithic elastomeric material being less stiff than said first elastomeric material to permit said second portion to bend relative to said first portion at said hinge area in said second portion.

2. An automobile floor mat as claimed in claim 1 wherein each of said first and second base portions have a uniform thickness throughout and coextensive with the respective first and second portions.

3. An automobile floor mat as claimed in claim 2 wherein said second base portion has a thickness about one half or less of said first base portion and said first and second monolithic elastomeric materials have approximately the same Shore A durometer readings.

4. An automobile floor mat as claimed in claim 3 wherein said first and second monolithic elastomeric materials have a Shore A durometer of about 85.

5. An automobile floor mat as claimed in claim 2 wherein said first and second base portions have approximately the same uniform thickness and said second monolithic elastomeric material has a Shore A durometer more than about 20 points below the Shore A durometer of said first elastomeric material.

6. An automobile floor mat as claimed in claim 2 wherein said second base portion has a thickness less than the thickness of said first base portion, and said second monolithic elastomeric material has a Shore A durometer more than about 20 points below the Shore A durometer of said first monolithic elastomeric material.

7. An automobile floor mat as claimed in claims 5 or 6 wherein said first monolithic elastomeric material has a Shore A hardness greater than about 70 and said second monolithic elastomeric material has a Shore A hardness greater than about 30 and less than about 50.

8. An automobile floor mat as claimed in claims 5 or 6 wherein said first elastomeric material has a Shore A hardness of about 85 and second elastomeric material has a Shore A durometer of about 40.

9. An automobile floor mat as claimed in claims 3, 5, or 6 wherein the first and second elastomeric materials are composed of a heat curable rubber.

10. An automobile floor mat as claimed in claims 3, 5, or 6 wherein said first and second monolithic elastomeric materials are composed of a styrene-butadiene rubber.

11. An automobile floor mat as claimed in claims 3, 5, or 6 wherein a carpet layer is embedded in an upper surface on each of said first and second portions to form a continuous, uniform carpet layer in said floor mat.

12. An automobile floor mat as claimed in claims 3, 5, or 6 wherein a nylon-tufted, cut pile carpet layer with a jute backing is embedded in said first and second monolithic elastomeric materials to form a continuous, uniform carpet layer in said floor mat.

13. An automobile floor mat as claimed in claims 3, 5 or 6 wherein said first portion has a leading edge adjacent said hinge area to act as a stop and adapted to prevent movement relative to the junction between a generally horizontal portion of an automobile floor and an inclined portion adjacent thereto.

14. An automobile floor mat comprising:
   a first portion adapted to contact a generally horizontal portion of an automobile floor,
   said first portion having a first base portion of a first monolithic elastomeric material with a Shore A durometer greater than about 70,
   a second portion adapted to contact an inclined portion adjacent said generally horizontal portion of an automobile floor,
   said second portion having a second base portion of a second monolithic elastomeric material,
   said first and second base portions each having a uniform thickness throughout and coextensive with the respective first and second portions,
   said first base portion and said second base portion being connected at a hinge area such that the mat can be molded in a single molding operation,
   said second monolithic elastomeric material being less stiff than said first elastomeric material to permit said second portion to bend relative to said first portion at said hinge area in said second portion,
   a leading edge in said first portion adjacent said hinge area to act as a stop and adapted to prevent movement relative to the junction between a generally horizontal portion of an automobile floor and an inclined portion adjacent thereto; and
   a carpet layer embedded in an upper surface on each of said first and second portions to form a continuous, uniform carpet layer on said automobile floor mat.

15. An automobile floor mat as claimed in claim 14 wherein said first and second monolithic elastomeric materials are composed of a styrene-butadiene rubber and said carpet layer is a nylon-tufted, cut pile carpet with jute backing.

16. An automobile floor mat as claimed in claim 14 wherein said second base portion has a thickness about one half or less of said first base portion and said first and second monolithic elastomeric materials have approximately the same Shore A durometer readings.

17. An automobile floor mat as claimed in claim 16 wherein said first and second monolithic elastomeric materials have a Shore A durometer of about 85.

18. An automobile floor mat as claimed in claim 14 wherein said first and second base portions have approximately the same uniform thickness and said second monolithic elastomeric material has a Shore A durometer more than about 20 points below the Shore A durometer of said first elastomeric material.

19. An automobile floor mat as claimed in claim 14 wherein said second base portion has a thickness less than the thickness of said first base portion, and said second monolithic elastomeric material has a Shore A durometer more than about 20 points below the Shore A durometer of said first monolithic elastomeric material.

20. An automobile floor mat as claimed in claims 18 or 19 wherein said first monolithic elastomeric material has a Shore A hardness greater than about 70 and said second monolithic elastomeric material has a Shore A hardness greater than about 30 and less than about 50.

21. An automobile floor mat as claimed in claims 18 or 19 wherein said first elastomeric material has a Shore A hardness of about 85 and second elastomeric material has a Shore A durometer of about 40.

* * * * *